United States Patent
McClellan

(10) Patent No.: US 6,323,489 B1
(45) Date of Patent: Nov. 27, 2001

(54) SINGLE CRYSTAL SCINITILLATOR

(75) Inventor: Kenneth J. McClellan, Los Alamos, NM (US)

(73) Assignee: Regents of the University of California, Los Alamos, NM (US)

( * ) Notice: Subject to any disclaimer, the term of this patent is extended or adjusted under 35 U.S.C. 154(b) by 0 days.

(21) Appl. No.: 09/326,056

(22) Filed: Jun. 4, 1999

(51) Int. Cl.$^7$ ...................................................... G01T 1/20
(52) U.S. Cl. ................................ 250/361 R; 252/301.4 R
(58) Field of Search .......................... 250/361 R, 483.1; 252/301.4 R; 117/13

(56) References Cited

U.S. PATENT DOCUMENTS

| | | | |
|---|---|---|---|
| 4,185,201 | * | 1/1980 | Stevels ................................ 250/483.1 |
| 4,647,781 | | 3/1987 | Takagi et al. ....................... 250/483.1 |
| 4,958,080 | | 9/1990 | Melcher ............................... 250/483.1 |
| 5,025,151 | | 6/1991 | Melcher ................................ 250/269 |
| 5,264,154 | | 11/1993 | Akiyama et al. ................... 252/301.4 |
| 5,500,147 | * | 3/1996 | Fitzpatrick .................... 252/301.6 S |
| 5,660,627 | | 8/1997 | Manette et al. ......................... 117/13 |
| 5,690,731 | * | 11/1997 | Kurata et al. ............................ 117/13 |

OTHER PUBLICATIONS

C.D. Brandle, A.J. Valentino, and G.W. Berkstresser, "Czochralski Growth of Rare–Earth Orthosilicates ($LN_2SiO_5$)," J. Crystal Growth, vol. 79, (1986), pp. 308–315.

C.L. Melcher, R.A. Manente, C.A. Peterson, and J.S. Schweitzer, "Czochralski Growth of rare–Earth Orthosilicates Single Crystals," J. Crystal Growth, vol. 128, (1993), pp. 1001–1005.

G.B. Loutts, A.I. Zagumennyi, S.V. Lavrishchev, Yu.D. Zavartsev, and P.A. Studenikin, "Czochralski Growth and Characterization of $(Lu_{1-}Gd_{-})_2SiO_5$ Single Crystals for Scintillators," J. Crystal Growth, vol. 174, (1997), pp. 331–336.

Piotr A. Rodnyi, "Physical Processes in Inorganic Scintillators," CRC Press, NY, (1997), p. 50.

* cited by examiner

Primary Examiner—Seungsook Ham
Assistant Examiner—Shun Lee
(74) Attorney, Agent, or Firm—Samuel L. Borkowsky

(57) ABSTRACT

The present invention relates to single crystal scintillators and includes a transparent single crystal of cerium-activated lutetium yttrium oxyorthosilicate having the general formula $Lu_{(2-x-z)}Y_xCe_zSiO_5$, wherein $0.05 \leq x \leq 1.95$ and $0.001 \leq z \leq 0.02$. The crystal scintillator of the present invention is dense, bright, rugged, and non-hygroscopic and has a relatively short decay time for luminescence. The invention also includes a scintillation detector using the crystal scintillator, which produces an electrical signal in response to light received from the crystal scintillator upon exposure to gamma rays, x-rays, and the like.

10 Claims, No Drawings

SINGLE CRYSTAL SCINITILLATOR

FIELD OF THE INVENTION

The present invention relates generally to single crystal scintillators for detecting radiation and more particularly, to single crystal scintillators having the formula $Lu_{(2-x-z)}Y_xCe_zSiO_5$ where $0.05 \leq x \leq 1.95$ and $0.001 \leq z \leq 0.02$. This invention was made with government support under Contract No. W-7405-ENG-36 awarded by the U.S. Department of Energy to The Regents of the University of California. The government has certain rights in the invention.

BACKGROUND OF THE INVENTION

Transparent single crystal scintillators are used to detect gamma rays, x-rays, cosmic rays, and other types of radiation, and to detect particles having energies of about 1 KeV and above. When radiation is incident on the scintillator, light pulses are generated by the scintillator that may be optically coupled to the photomultiplier tube of a scintillation detector to produce a voltage signal that is related to the number and amplitude of the light pulses received by the photomultiplier tube. Crystal scintillators are used in digital radiography, medical imaging, mineral and petroleum exploration, and other important applications.

A widely used scintillation detector employs the thallium-doped sodium iodide scintillator, NaI(Tl); it has a very high light output (i.e., is a very bright scintillator) in response to radiation and is relatively inexpensive to produce. Scintillation detectors employing NaI(Tl) are used in logging tools to aid in the location of petroleum deposits.

Inorganic metal oxides are another important group of materials used in scintillation detectors. These include bismuth germanium oxide $Bi_4Ge_3O_{12}$ (BGO) and cerium-activated oxyorthosilicates, which include cerium-activated gadolinium oxyorthosilicate $Gd_{(2-x)}Ce_xSiO_5$ (Ce:GSO), cerium-activated lutetium oxyorthosilicate $Lu_{(2-x)}Ce_xSiO_5$ (Ce:LSO), and cerium-activated yttrium oxyorthosilicate $Y_{(2-x)}Ce_xSiO_5$ (Ce:YSO). The data in The Table below, which is taken from the papers and patents that follow, summarizes relevant physical properties for NaI(Tl), Ce:BGO, Ce:GSO, Ce:LSO, and Ce:YSO. The decay time in nanoseconds refers to the time it takes for a particular scintillator crystal to luminesce from the excited electronic state, which is the time required before the crystal can respond to additional radiation once it been exposed to sufficient radiation to produce an electronically excited state in the crystal. The reported range of decay times for several entries is likely a result of the difficulty in obtaining consistently uniform incorporation of cerium into the product crystal scintillator during crystal growth. The emission peak wavelength in nanometers refers to the wavelength maximum in the emission spectrum for the particular crystal scintillator.

TABLE 1

| Property | NaI(Tl) | BGO | Ce:GSO | Ce:LSO | Ce:YSO |
|---|---|---|---|---|---|
| Density (g/cm³) | 3.67 | 7.13 | 6.71 | 7.4 | 4.45 |
| Relative light output | 100 | 12 | 25 | 75 | 118 |
| Decay time (ns) | 230 | 300 | 60 | 40 | 40–70 |
| Emission peak wavelength (nm) | 410 | 480 | 430 | 420 | 420 |
| Rugged | No | Yes | No | Yes | Yes |
| Hygroscopic | Yes | No | No | No | No |

U.S. Pat. No. 4,958,080 to C. L. Melcher entitled "Lutetium Orthosilicate Single Crystal Scintillator Detector," which issued on Sep. 18, 1990, describes Ce:LSO.

U.S. Pat. No. 5,025,151 to C. L. Melcher entitled "Lutetium Orthosilicate Single Crystal Scintillator Detector", which issued on Jun. 18, 1991, describes an apparatus that uses the Ce:LSO scintillator of the '080 patent to investigate subsurface earth formations.

"Czochralski Growth of Rare Earth Oxyorthosilicate Single Crystals" by C. L. Melcher et al. was published in J. Crys. Growth, vol. 128, p. 1001–1005, (1993) and describes using the Czochralski crystal growing method to prepare single crystals of Ce:GSO, Ce:LSO, and Ce:YSO.

U.S. Pat. No. 5,660,627 to R. A. Manente et al. entitled "Method of Growing Lutetium Oxyorthosilicate Crystals," which issued on Aug. 26, 1997, describes an improved Czochralski crystal growth method for growing an LSO crystal that displays substantially uniform scintillation behavior throughout the crystal. Also described is a scintillation detector used with the crystal. "Physical Processes in Inorganic Scintillators" by P. A. Rodnyi, p. 50, CRC Press, New York, N.Y. (1997), includes data relating to Ce:YSO.

Ideally, a crystal scintillator is inexpensive to produce, has a fast decay time, and is dense, bright, and is a rugged crystal. As The Table clearly demonstrates, the decision to use a particular scintillator involves compromises between the various physical properties. Although NaI(Tl) is a very bright crystal scintillator, it is not dense so that much of the radiation incident on the crystal is not absorbed by the crystal. Due to its hygroscopic nature, NaI(Tl) must be protected from moisture and because it is not rugged, it should not be used in applications where it is subject to fracture. Finally, NaI(Tl) has the relatively long luminescence decay time of over 400 ns.

BGO is almost twice as dense as NaI(Tl) and is a rugged and non-hydroscopic crystal. However, BGO is not as bright a crystal as NaI(Tl) and has an even longer decay time. Ce:GSO is also a dense crystal scintillator and is a brighter crystal than BGO. However, Ce:GSO is not a rugged crystal.

Ce:YSO is a bright, rugged, non-hygroscopic crystal. Importantly, the starting yttrium oxide $Y_2O_3$ which is used to grow Ce:YSO is relatively inexpensive, about $20/kg for 99.99% pure $Y_2O_3$. Ce:YSO has a melting temperature of about 2000° C., which is about 150 degrees lower than the melting temperature for Ce:LSO, making fabrication of Ce:YSO easier and less energy demanding than that for Ce:LSO. Unfortunately, Ce:YSO is not a very dense crystal, and decay times as long as 70 ns have been reported for this material.

Of the scintillators listed in The Table, Ce:LSO has the most desirable physical properties; it is a bright, dense, rugged, non-hygroscopic scintillator, and has a short decay time. However, Ce:LSO is extremely expensive, about $2,000/kg for 99.99% pure material. In addition, the processing temperature for growing Ce:LSO is very high; $Lu_2O_3$ and LSO melt at temperatures of about 2310° C. and 2150° C., which adds to the difficulty of growing crystals of Ce:LSO.

Efforts to provide oxyorthosilicate scintillators with a broader range of properties have led to the production of cerium-activated single crystal scintillators having compositions that include a variety of lanthanide elements in combination with Gd, Lu, and Y. Examples of these are described in the papers and patents that follow. "Czochralski Growth of Rare-Earth Orthosilicates $(Ln_2SiO_5)$" by C. D. Brandle was published in J. Crys. Growth, vol 79, p. 308–315, (1986) and provides an evaluation of the Czochralski method for growing GSO, YSO, and a variety of orthosilicates containing either Gd or Y doped with a lanthanide series element. The reported combinations with Y were YSO doped with Ce, Pr, Nd, Sm, Gd, Tb, Er, Tm, and Yb. The reported combinations with Gd were GSO doped with Ce and Tb. "Czochralski Growth and Characterization of $(Lu_{1-x}Gd_x)_2SiO_5$" by G. B. Loutts et al. entitled was published in J. Crys. Growth, vol. 174, p. 331–336, (1997), and describes single crystal oxyorthosilicate scintillators having both Lu and Gd.

U.S. Pat. No. 4,647,781 to K. Takagi et al. entitled "Gamma Ray Detector," which issued on Mar. 3, 1987, describes a cerium-activated oxyorthosilicate scintillator having both Gd and Y and/or La. These scintillators have the general formula $Gd_{2(1-x-y)}Ln_{2x}Ce_{2y}SiO_5$ where Ln is yttrium and/or lanthanum, where $0 \leq x \leq 0.5$, and $1 \times 10^{-3} \leq y \leq 0.1$.

U.S. Pat. No. 5,264,154 to S. Akiyama et al. entitled "Single Crystal Scintillator," which issued on Nov. 23, 1993, describes a single crystal scintillator and apparatus for prospecting underground strata using the scintillator. The single crystal scintillator is a cerium-doped oxyorthosilicate having the general formula $Gd_{2-(x+y)}Ln_xCe_ySiO_5$ wherein Ln is Sc, Tb, Lu, Dy, Ho, Er, Tm, or Yb, $0.03 \leq x \leq 1.9$, and $0.001 \leq y \leq 0.2$.

Clearly, it is desirable to provide an affordable crystal scintillator having the most desirable properties for a particular application.

Therefore, an object of this invention is to provide an oxyorthosilicate crystal scintillator that can be used to detect gamma rays, x-rays, and the like.

Another object of the invention is to provide a crystal scintillator having excellent physical properties at a reasonable cost. Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention as embodied and broadly described herein, the invention includes a transparent single crystal scintillator of cerium-activated lutetium yttrium oxyorthosilicate having the general formula $Lu_{(2-x-z)}Y_xCe_zSiO_5$, wherein $0.05 \leq x \leq 1.95$ and $0.001 \leq z \leq 0.02$.

DETAILED DESCRIPTION OF THE INVENTION

The present invention includes a single crystal scintillator containing lutetium and yttrium and having the general formula $Lu_{(2-x-z)}Y_xCe_zSiO_5$ where $0.05 \leq x \leq 1.95$ and $0.001 \leq z \leq 0.02$. The invention also includes a scintillation detector for detecting gamma rays, x-rays, and the like using the crystal scintillator. The crystal scintillators of the present invention were grown using two conventional crystal growing processes: (1) the "Optical Float zone" method, and (2) the "Czochralski" method. The starting oxide materials used were $Lu_2O_3$, $CeO_2$, $Y_2O_3$, and $SiO_2$, and each had a purity of 99.99%.

A crystal of the present invention was grown by the optical float zone method by first blending $Lu_2O_3$ (71.4487 g), $CeO_2$ (0.1721 g), $Y_2O_3$ (4.5049 g), and $SiO_2$ (12.0169 g) in a mixer/mill for 30 minutes to give the composition $Lu_{1.7955}Y_{0.1995}Ce_{0.0050}SiO_{5.0025}$. The blended powder was loaded into a latex cold isostatic pressing (CIP) tube and pressed to about 7000 $N/cm^2$ for about 5 minutes. The resulting pressed rods were fired at about 1100° C. for about 8 hours to impart additional mechanical stability. After cooling, the rods were mounted in a dual halogen optical float-zone crystal growth furnace using platinum wire for fixturing. A single crystal was grown at a rate of about 2.0–2.5 mm/hr under flowing air using a seed crystal of Ce:LSO and standard float zone procedures. A stable molten zone was established between the seed crystal and the feed rod, which were counter-rotated at 45–60 rpm and passed through the hot zone.

The measured light output of the above single crystal of the present invention indicated that the crystal was as bright as Ce:LSO crystals made by the same crystal growing process. The measured crystal density of 7.1 $g/cm^3$, which is identical to the density calculated by rule of mixtures, was only slightly lower than the reported density of 7.4 $g/cm^3$ for Ce:LSO. The measured peak emission wavelength for the single crystal of the present invention was 420 nm.

A larger crystal having the same powder blend composition as the first was grown using the Czochralski method, which is discussed in the 1986 paper to D. C. Brandle et. al. as previously described. About 320 g of starting oxide powder was blended and charged into an iridium crucible. Under a nitrogen atmosphere and using an iridium seed rotated at about 30 rpm, a 15-mm diameter single crystal was grown at a crystal growth rate of 1.5 mm/hr. The crystal was dense, bright, non-hygroscopic and rugged. The measured luminescence decay for this crystal was about 35–45 ns. For comparison, a crystal of Ce:LSO were grown by the Czochralski method. Less power was required to grow the crystal of the present invention than to grow the Ce:LSO crystal.

The optical float zone method was also used to grow additional crystals of the present invention, which included crystals from the starting blended oxide powders $Lu_{1.1970}Y_{0.7980}Ce_{0.0050}SiO_{5.0025}$ and $Lu_{0.9975}Y_{0.9975}Ce_{0.0050}SiO_{5.0025}$.

The crystal scintillators of the present invention can be used in a scintillation detector. To provide the scintillation detector, the crystal scintillator is optically coupled to a photodetector, which produces an electrical signal in response to light produced from the crystal scintillator in response to gamma rays, x-rays, and the like radiation incident upon the crystal scintillator. A wide variety of photodetectors can be used, such as photomultiplier tubes, photodiodes, microchannel plates, charge-coupled devices such as video cameras, etc. The crystal can be coupled to the photodetector by any of a variety of well-known coupling mechanisms or devices such as optical fibers, lenses, mirrors, grease, etc.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A crystal scintillator comprising a transparent single crystal of cerium-activated lutetium yttrium oxyorthosilicate having the general formula $Lu_{(2-x-z)}Y_xCe_zSiO_5$, wherein $0.05 \leq x \leq 1.95$ and $0.001 \leq z \leq 0.02$.

2. The crystal scintillator of claim 1, wherein $0.2 \leq x \leq 1.8$.

3. The crystal scintillator of claim 2, wherein said scintillator has a luminescence wavelength of about 420 nm.

4. The crystal scintillator of claim 3, wherein said scintillator has a luminescence decay time of about 35–45 ns.

5. A scintillation detector, comprising:
   (a) a crystal scintillator comprising a transparent single crystal of cerium-activated lutetium yttrium oxyorthosilicate having the general formula $Lu_{(2-x-z)}Y_xCe_zSiO_5$, wherein $0.05 \leq x \leq 1.95$ and $0.001 \leq z \leq 0.02$; and
   (b) a photodetector optically coupled to said crystal scintillator for detecting light from said crystal scintillator.

6. The detector of claim 5, wherein said photodetector comprises a photomultiplier tube.

7. The detector of claim 5, wherein said photodetector comprises a charge-coupled device.

8. A scintillation detector, comprising:
   (a) a crystal scintillator comprising a transparent single crystal of cerium-activated lutetium yttrium oxyorthosilicate having the general formula $Lu_{(2-x-z)}Y_xCe_zSiO_5$, wherein $0.2 \leq x \leq 1.8$ and $0.001 \leq z \leq 0.02$; and
   (b) a photodetector optically coupled to said crystal scintillator for detecting light from said crystal scintillator.

9. The detector of claim 8, wherein said photodetector comprises a photomultiplier tube.

10. The detector of claim 8, wherein said photodetector comprises a charge-coupled device.

* * * * *

Adverse Decision In Interference

Patent No. 6,323,489, Kenneth J. McClellan, SINGLE CRYSTAL SCINITILLATOR, Interference No. 105,083, final judgment adverse to the patentee rendered April 28, 2003, as to claims 1-10.
*(Official Gazette June 10, 2003)*